May 20, 1958  F. C. G. BERTHIEZ  2,835,136
HYDRAULICALLY CONTROLLED SPEED CHANGE APPARATUS
Filed July 20, 1955

Frederick Charles Gilbert Berthiez
INVENTOR
By George H. Corey
His Attorney

United States Patent Office 2,835,136
Patented May 20, 1958

2,835,136
HYDRAULICALLY CONTROLLED SPEED CHANGE APPARATUS

Frederick Charles Gilbert Berthiez, Lamorlaye, France, assignor to Societe Anonyme des Anciens Etablissements Charles Berthiez, Paris, France Application July 20, 1955, Serial No. 523,336

Claims priority, application France July 21, 1954

13 Claims. (Cl. 74—335)

This invention relates to hydraulically controlled speed change apparatus.

The invention provides a hydraulically controlled speed change apparatus which includes a longitudinally movable gear carrying shaft having each of its ends arranged to be acted upon directly by the hydraulic fluid thereby longitudinally to move said shaft.

The invention also provides a hydraulically controlled speed change apparatus which includes a gear carrying shaft longitudinally movable in its bearings and having each of its ends arranged within a hydraulic chamber whereby said ends can be acted upon directly by the hydraulic fluid thereby longitudinally to move said shaft.

Further the invention provides a hydraulically controlled speed change apparatus which comprises a gear carrying shaft longitudinally movable in its bearings, hydraulic chambers into each of which an end of said shaft projects and a hydraulic fluid control valve by means of which hydraulic fluid can selectively be fed to the hydraulic chambers thereby selectively to move said shaft.

Further features and advantages of the invention will become apparent from the following description, given by way of example only, of one particular embodiment thereof which is shown in the accompanying drawings, in which.

Figure 1:
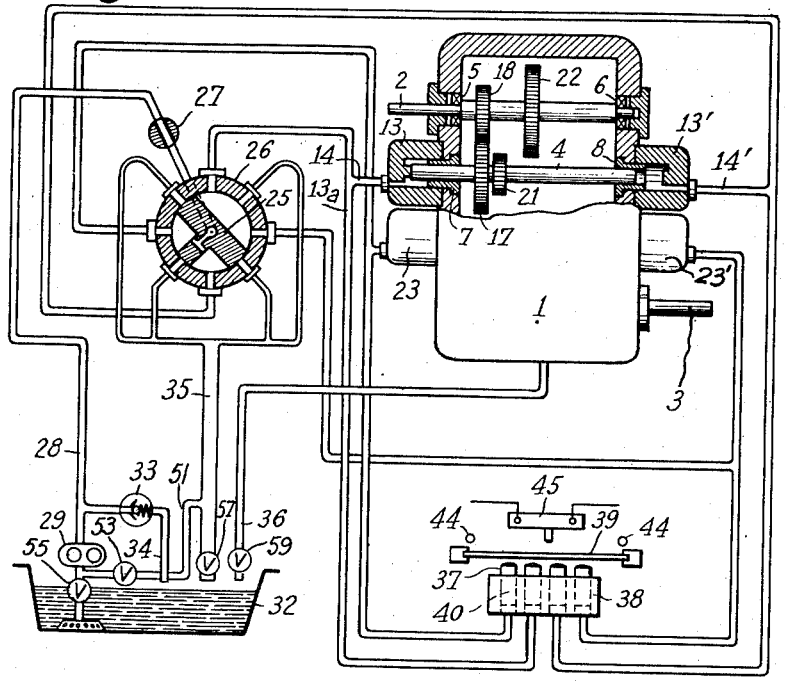
Figure 1 shows in part a section and in part an elevation of a change speed gear box according to the invention having two hydraulically operated sliding shafts, the hydraulic circuit being shown diagramatically.

Referring to Figure 1, the change speed gear box 1, comprises a driving or input shaft 2, a driven or output shaft 3, and two slidable lay shafts 4. These two lay shafts are mounted in an exactly similar fashion so only one is shown in the drawing.

The input and output shafts 2 and 3 are mounted in any suitable manner for example, by means of ball or roller bearings 5 and 6. The lay shaft 4 is rotatable in two plain bearings 7 and 8 which are fixed in the wall of the casing of the change speed gear box 1.

Figure 2:
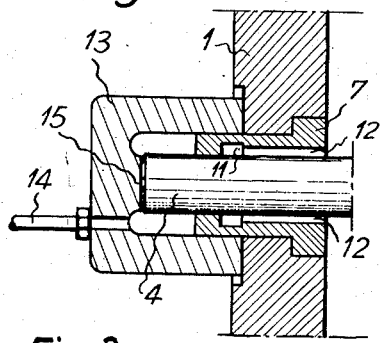
Figure 2 is a section, on a larger scale, of a detail of Fig. 1.

The two bearings 7 and 8 are identical and have a special inner shape. Referring to Figure 2 in the bore of the bearing 7 there is provided an annular chamber or groove 11 into which several longitudinal grooves 12, open the other ends of these grooves opening into the interior of the gear box. The shape of the annular groove 11 and of the grooves 12 is not critical as they are only passages for the pressure fluid which is for example oil. For the same reason any number of grooves 12 may be provided.

The bearing 7 projects through the casing of the gear box and serves to centre on shaft 4 a control cylinder 13, which is attached to a machine part of the outer surface of the casing and is provided with a pipe 14 for the admission or exhaust of the pressure fluid. The end of the cylinder 13 has a machined surface 15 designed to serve as an end abutment for the shaft 4 the other end of which is adapted to abut on a similar end abutment of an identical cylinder 13' when shaft 4 is moved to the right in Fig. 1.

Figure 3:
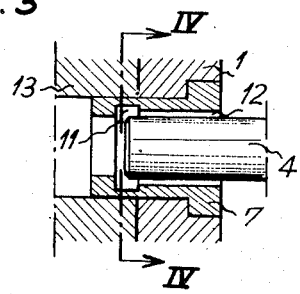
Figure 3 is a similar section to Figure 2, with the sliding shaft in a different position.
Figure 4:
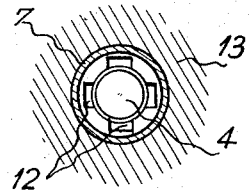
Figure 4 is a section along the line IV—IV of Figure 3.

The arrangement is such that, when the lay shaft 4 abuts on the end abutment of cylinder 13 (as shown in Figure 1), the gear wheel 17 fast on this lay shaft 4 is in mesh with the gear pinion 18 fast on the input shaft 2. When the shaft 4 abuts on the end abutment of cylinder 13', the pinion 21 fast on the lay shaft 4 is in mesh with the gear wheel 22 which is fast on the driving shaft 2. In this position of the shaft 4 (Fig. 3), the left end thereof is clear of the annular groove 11 of the bearing 7, whereby the oil under pressure in the cylinder 13 can pass the end of the shaft 4 into the longitudinal grooves 12, lubricating, in passing, the shaft 4, and then passes into the casing of the change speed gear box.

The other lay shaft of the change speed gear box can likewise slide longitudinally under the pressure of the oil which can be fed selectively into cylinders 23, 23', (Fig. 1).

The supply of oil under pressure to the cylinders can be effected by any suitable system such as that illustrated diagrammatically in Fig. 1. The system comprises a distributor having a rotor 25 adapted to assume, in the interior of a stator 26, four positions at right angles to one another corresponding to the supply of oil under pressure to the two pairs of cylinders 13, 13'—23,23'. A central oil admission port in the rotor 25 is connected through a cock 27, and a pipe 28 to a pump 29, thence to an oil container 32. A relief valve is indicated at 33 which has a return pipe 34 to the oil container 32.

The stator 26 of the distributor is provided with a conduit 35 leading back to the oil container 32. It will be seen that, in the position of the rotor 25 illustrated in Fig. 1, the oil under pressure will be admitted into the cylinder 13' and 23 while the cylinders 13 and 23' are connected to the oil container 32 by their respective conduits through the stator 26 and the common return conduit 35. The casing of the change speed gear box is likewise connected to the oil container 32 by a return conduit 36.

In place of the distributor 25—26 illustrated, any other suitable type of distributor could be used.

Figures 5, 6:
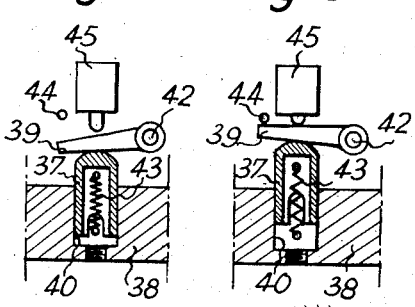
Figures 5 and 6 show on a larger scale the safety members represented in Figure 1.

Provision is also made for a signalling and/or safety device to indicate the moment when the shaft, which has been moved, has reached the end of its stroke, and to prevent the gear box from operating while the shaft is still moving. For this purpose each control cylinder such as 13 is connected by a conduit 13a to an indicating device which has an indicating piston 37 Fig. 5. All the indicator pistons are arranged in a row on a common support 38 on top of which a plate 39 is arranged which is capable of oscillating about a fixed axis 42, Figs. 5 and 6, when any one of the indicator pistons 37 is raised by the oil pressure against the bias of a return spring 43. Two stops 44 limit the upward movement of the plate 39. Above the plate 39 a circuit breaker 45 is arranged which can, for example, be a snap-action micro-switch the plunger of which is adapted to be actuated by the plate 39 when the latter rises due to the upward movement of any one of the indicator pistons 37. The circuit breaker 45 is adapted to control the circuit of a visual or acoustic indicating device which may be for example, a simple warning lamp. It may also control a safety control device.

The operation of the hydraulically controlled gear box is as follows:

Assuming all the members to be in the positions they occupy in Fig. 1, it is then desired to put the pinion 21 carried by the shaft 4 into mesh with the gear wheel 22 without altering the position of the second lay shaft. For this purpose the rotor 25 of the distributor is turned one quarter turn in a clockwise direction with respect to Fig. 1, and a cock 27 is opened. The oil under pressure from the pump 29 passes through pipe 28, cock 27, rotor 25 of the distributor and the conduit 14 and enters into the cylinder 13, Figs. 1 and 2. The oil forces the shaft 4 towards the right, Fig. 1, until the end of the shaft is clear of the groove 11 in the bearing 7, Fig. 3, and its other end abuts the end abutment of the opposite cylinder 13'. The oil under pressure admitted into the cylinder 13 then passes into the groove 11, through the longitudinal grooves 12 of the bearing 7, thereby lubricating the shaft 4, and is then discharged into the casing 1 of the change speed gear box. The pinion 21 has now been brought into mesh with the gear wheel 22. During the shifting of the shaft 4 the oil contained in the cylinder 13' has been expelled through the conduit 14' and the stator 26 of the distributor and then through a conduit 35, thereby returning to the oil container 32.

As soon as oil under pressure is admitted into any one control cylinder, for example the cylinder 13, the oil pressure is transmitted through the conduit 13a to the corresponding indicator piston 37 which raises the plate 39, thereby actuating the circuit breaker 45. During all the time the shaft 4 is moved by the oil under pressure in the cylinder 13 the corresponding indicator piston 37 is kept raised, Fig. 6, but as soon as the shaft 4 has reached the end of its stroke, the oil flows freely through annular groove 11 and grooves 12 into the casing 1 of the change speed gear box, and the pressure drops abruptly in the cylinder 13 as well as in the conduit 13a so that the corresponding indicator piston 37 drops back under the action of its return spring 43.

Consequently, whenever one of the lay shafts is being moved, the circuit breaker 45 is actuated and the warning and/or controlling device is actuated.

In order to move the shaft 4 towards the left, that is, to restore it to its original position, oil must be fed to the cylinder 13' in the same manner as the cylinder 13 had been fed previously. To accomplish this the rotor 25 must be turned to the position illustrated in Fig. 1 so that oil contained in the cylinder 13 will then return to the oil container through the conduit 14, the distributor 26 and the conduit 35.

Similarly by turning the rotor 25 to the appropriate position the two other cylinders 23, 23' may be operated.

For each of the four angular positions of the rotor 25 one cylinder in each lay shaft is put under pressure and the opposite cylinders are connected to the oil container. Thus four combinations in the positions of the two lay shafts are possible, the lay shafts being locked in any one of the positions selected.

In the preceding description it has been assumed that one end of the shaft 4 engages the end abutment of the cylinder 13 or 13'. It would be possible to dispense with such a mechanical abutment by applying a counter pressure to the cylinder being exhausted. The dimensions of the annular passage 11 between the shaft 4 and the bearing 7 are calculated such that the said shaft 4 is held between two liquid cushions without mechanical abutment.

For this purpose the hydraulic system instead of operating on an open circuit as has been described, would operate on a closed circuit system, the common return pipe 35 being connected by pipe 51 to the intake side of the pump 29, this pipe 51 including valve 53. Valves 55 and 57 respectively connected in the suction line to the pump 29 and in the return line 35 would be closed to establish the circuit through pipes 35, 51 and 28, valve 59 in pipe 36 being closed and valve 53 being open. The valves 55 and 57 may be opened and valve 53 closed when it is desired to draw the oil from the container 32 for delivery to the distributor and to return the oil to the container 32.

The invention is not limited to the embodiments described and illustrated which have been given by way of example, but is capable of modifications depending upon the uses contemplated for it, without departing from the scope of the invention as defined by the appended claims.

For example, the structure of the control cylinders, the distributor, the indicator and signalling apparatus could be constructed in a different manner to that illustrated; also the plain bearing of the shaft 4 could be replaced by a cylindrical roller bearing or by a needle bearing which would still allow axial displacement of the shaft.

I claim:

1. Hydraulically controlled speed change apparatus which comprises a shaft, means for supporting said shaft for rotation thereof on its axis and for movement thereof parallel to its axis between two predetermined axially spaced positions of said shaft, a gear mounted on said shaft for rotation therewith and for movement with said shaft parallel to said axis of said shaft between two transmission positions of said gear corresponding to said predetermined positions of said shaft, and means providing fluid pressure chambers adjacent the respective ends of said shaft in fluid pressure communication with surfaces of said shaft transverse to said axis of said shaft and disposed adjacent said respective ends of said shaft, said fluid pressure chamber means cooperating with said shaft supporting means to confine fluid pressure respectively on a given transverse surface and on the other transverse surface of said shaft for effecting movement of said shaft and gear parallel to said axis of said shaft to a selected one of said transmission positions and to the other transmission position of said gear upon development of fluid pressure in the fluid pressure chambers communicating respectively with said given and said other transverse surfaces of said shaft.

2. Hydraulically controlled speed change apparatus as defined in claim 1 which comprises means for limiting the movement of said shaft parallel to the axis thereof for determining said two predetermined positions of said shaft and said transmission positions of said gear.

3. Hydraulically controlled speed change apparatus as defined in claim 1 which comprises selector means operable to two positions, fluid pressure conduits connected between said selector means and said chambers for supplying fluid under pressure to said chambers to effect movement of said shaft and said gear parallel to the axis of said shaft selectively to said selected transmission position and to said other transmission position of said gear upon operation of said selector means respectively to said two positions thereof.

4. Hydraulically controlled speed change apparatus as defined in claim 1 in which said means for supporting said shaft comprises bearings supporting said shaft adjament the respective ends of said shaft and in bearing relation to the circumferential surface of said shaft to provide for said rotation and said axial movements of said shaft, each of said bearings providing a channel extending along said shaft parallel to the axis thereof and providing an opening communicating with said channel into which opening the adjacent end of said shaft enters to close said opening upon movement of said shaft in the direction toward said bearing from said other bearing so as to control flow of fluid under pressure between the adjacent fluid pressure chamber and said channel of said bearing.

5. Hydraulically controlled speed change apparatus as defined in claim 4 in which said bearings each have an annular groove surrounding said shaft and communicating with said channel, said bearings each having a portion engaging said circumferential surface of said shaft to close said opening when said shaft is disposed in said opening upon said movement of said shaft toward said end thereof, said opening being uncovered by said shaft upon movement of said shaft toward said other end thereof to a position with its circumferential surface out of engagement with said portion so as to establish communication between the adjacent fluid pressure chamber and said annular groove and said channel.

6. Hydraulically controlled speed change apparatus as defined in claim 1 which comprises an abutment disposed within each fluid pressure chamber for engaging the end of said shaft adjacent said chamber for limiting the movement of said shaft in the direction toward said chamber.

7. Hydraulically controlled speed change apparatus as defined in claim 1 which comprises means for developing in said fluid pressure chamber adjacent said other transverse surface of said shaft fluid pressure against said other transverse surface of said shaft opposing the pressure on said given transverse surface of said shaft for limiting the movement of said shaft in the direction from said given transverse surface toward said other transverse surface of said shaft.

8. Hydraulically controlled speed change apparatus comprising a plurality of shafts, means for supporting each of said shafts for rotation thereof on its axis and for movement thereof parallel to its axis between two predetermined axially spaced positions of said shaft, a gear mounted on each shaft for rotation therewith and for movement with said shaft parallel to said axis of said shaft between two transmission positions of said gear corresponding to said predetermined positions of said shaft, means providing fluid pressure chambers adjacent the respective ends of each shaft in fluid pressure communication with surfaces of said shaft transverse to said axis of said shaft and disposed adjacent said respective ends of said shaft, said fluid pressure chambers of each shaft cooperating with the shaft supporting means of said shaft to confine fluid pressure respectively on a given transverse surface and on the other transverse surface of the said shaft for effecting movement of said shaft and the gear mounted thereon parallel to said axis of said shaft to a selected one of said transmission positions and to the other transmission position of said gear upon development of fluid pressure in the fluid pressure chambers of said shaft communicating respectively with said given and said other transverse surfaces of said shaft, a source of hydraulic fluid, pump means connected to said source for supplying said hydraulic fluid under pressure, hydraulic selector means, an inlet on said hydraulic selector means and connected to said pump means to receive said hydraulic fluid under pressure from said pump means, an exhaust outlet on said hydraulic selector means connected to said source of hydraulic fluid for return of fluid to said source, and a plurality of conduits connected between said hydraulic selector means and the respective fluid pressure chambers for delivering said fluid under pressure to said fluid pressure chambers adjacent said given and said other transverse surfaces of the respective shafts and for conveying the hydraulic fluid from the fluid pressure chambers adjacent the other and said given transverse surface of the respective shafts to provide for said movements of said shafts and said gears respectively mounted thereon and return of said fluid to said source, said selector means being operable and said conduits being connected thereto so as to effect said movements of said shafts in predetermined directions parallel to the axis one with respect to the other.

9. Hydraulically controlled speed change apparatus as defined in claim 8 which comprises indicating means respectively connected to said fluid pressure chambers for indicating fluid pressure in the respective chambers.

10. Hydraulically controlled speed change apparatus as defined in claim 9 in which each of said indicating means comprises a cylinder, a piston disposed within said cylinder for movement thereof parallel to the axis of the cylinder, a spring connected to said piston for biasing said piston to move in said cylinder in a predetermined direction parallel to said axis, and conduits connected between the respective fluid pressure chambers and said cylinders so that said hydraulic fluid under pressure acts upon said pistons against the bias of said springs.

11. Hydraulically controlled speed change apparatus as defined in claim 10 which comprises an electric switch, and means operatively connecting said pistons to said switch for actuating said switch upon operation of any of said pistons under fluid pressure of the chamber to which the cylinder of said indicating means containing said piston is connected.

12. Hydraulically controlled speed change apparatus as defined in claim 1 which comprises a conduit connected between said chambers, and means in said conduit for effecting delivery through said conduit of fluid under pressure to one of said chambers and concomitantly discharge of fluid from the other of said chambers through said conduit.

13. Hydraulically controlled speed change apparatus as defined in claim 1 which comprises means connected to said fluid pressure chambers for controlling the pressures of the fluid in said chambers so as to provide opposing fluid pressures at said ends of said shaft determining said positions of said shaft.

References Cited in the file of this patent
UNITED STATES PATENTS

| | | |
|---|---|---|
| 2,079,684 | Church | May 11, 1937 |
| 2,403,328 | Banning | July 2, 1946 |
| 2,519,794 | Siekmann et al. | Aug. 22, 1950 |